United States Patent [19]

Keller

[11] E Re. 31,472

[45] Reissued Dec. 27, 1983

[54] IGNITION CABLE TERMINAL CONSTRUCTION

[75] Inventor: James M. Keller, Burtchville Township, Saint Clair County, Mich.

[73] Assignee: Allied Corporation, Morristown, N.J.

[21] Appl. No.: 325,474

[22] Filed: Nov. 27, 1981

Related U.S. Patent Documents

Reissue of:

[64] Patent No.: 4,284,322
Issued: Aug. 18, 1981
Appl. No.: 100,771
Filed: Dec. 6, 1979

[51] Int. Cl.[3] ..... H01R 11/08; H01R 43/04

[52] U.S. Cl. ..... 339/223 S; 29/862; 29/857

[58] Field of Search ..... 29/861, 862, 863, 867, 29/869, 871, 872, 828; 339/223 R, 223 S, 276 R, 276 S; 174/78, 74 R; 338/66, 214, 270, 332

[56] References Cited

U.S. PATENT DOCUMENTS 802,994 10/1905 Kliegl ..... 339/223
1,824,447 9/1931 Richter .
3,518,606 6/1970 Barker .
3,597,723 8/1971 Schmidt et al. .
4,209,221 6/1980 Chupak et al. .
4,284,322 8/1981 Keller .

FOREIGN PATENT DOCUMENTS 48-25589 7/1973 Japan .

*Primary Examiner*—Mark Rosenbaum
*Assistant Examiner*—Carl J. Arbes
*Attorney, Agent, or Firm*—James P. DeClercq

[57] ABSTRACT

A method and means for improving the connection between a resistive core ignition wire and a terminal is disclosed. The improvement comprises placing a conductive metallic band around the outer insulation of the wire after exposing the core, and folding the core back over the conductive metallic band before crimping the terminal in place. The invention is best suited for use with ignition wire of the type having a conductive elastomeric or polymeric coating around the central core, and eliminates possible loss of electrical contact between the core and the terminal which may occur due to plastic deformation of the wire at elevated temperatures.

9 Claims, 8 Drawing Figures

IGNITION CABLE TERMINAL CONSTRUCTION

Matter enclosed in heavy brackets [ ] appears in the original patent but forms no part of this reissue specification; matter printed in italics indicates the additions made by reissue.

FIELD OF THE INVENTION

The present invention relates generally to termination of ignition cable, and more particularly to strip-and-fold-back termination of resistive core ignition cable.

DESCRIPTION OF THE PRIOR ART

Resistive core ignition cables for use in automotive vehicle ignition systems to dampen current oscillations following the firing of a spark plug, and minimize electromagnetic interference to electronic receiving equipment, such as radios and televisions, [is] *are* well known. To facilitate mass production of such ignition cables, a type of ignition cable having a conductive elastomeric or polymeric material encasing the central resistive core has been developed, to allow a simple and inexpensive method of termination by stripping off the outer insulation, folding the encased core back over the outer insulation, and crimping a terminal ferrule over the core and outer insulation.

However, during accelerated life testing designed to simulate actual vehicle service over an extended [periods] *period* of time equivalent to more than 50,000 miles of vehicle use, it was found that electrical contact between the core and terminal was lost. It was found that plastic deformation of the insulation of the wire allowed the folded-back core to become partially embedded in the outer insulation, allowing an effective gap to develop between the resistive core and the terminal ferrule. Upon firing a spark plug with a cable in such a condition, sparks jumping this gap cause high localized heating and erosion of the resistive conductor, leading to complete failure of the ignition cable. It is believed that loss of firm contact between the resistive core and the terminal ferrule allows the formation of a high-temperature corrosion or outgassing product of one of the components to form an insulating layer between the terminal ferrule and the folded-back core. *Also, it is believed that similar problems may affect the use of this simple and inexpensive method of termination with a solid wire core or stranded wire core, which may be smaller diameter than resistive cores, for off-road vehicular use and for non-automotive applications, such as for spark-ignition stoves and furnaces and the like.* The present invention overcomes the aforementioned [deficiency] *deficiencies* in the prior art.

SUMMARY OF THE INVENTION

It is a principle object of the invention to improve *or establish* the reliability of an electrical connection between the [resistive] core of an ignition cable and a terminal ferrule crimped in place on the ignition cable by the use of a conductive metallic member placed on the outer insulation of the cable before folding the exposed central [resistive] core over the metallic member, and crimping a terminal ferrule over the core, metallic member, and insulation.

It is a further object of the invention to provide an improved termination for ignition cable which is suitable for production on automatic machines on a mass production line.

It is *a* further object of the invention to produce an improved termination for ignition cable which is simple and inexpensive to construct, has a stable resistance, and is mechanically strong to withstand abuse during repair and maintenance of an automotive vehicle engine *or other device.*

DESCRIPTION OF THE PREFERRED EMBODIMENT

Figure 1:
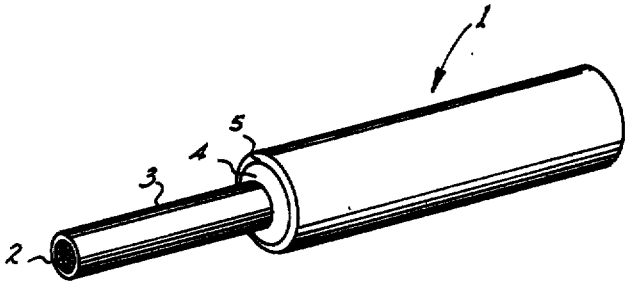
FIG. 1 is a perspective view showing an ignition cable with a portion of the outer covering removed to expose the central conductor.

Referring to FIG. 1, there is shown an ignition cable 1 having a central resistive conductive core 2, a conductive elastomeric or polymeric layer 3 encasing central resistive conductive core 2, an inner layer of insulation 4 concentric with core 2 and layer 3, and an outer layer of insulation 5, concentric with inner layer 4. In FIG. 1, ignition cable 1 is shown with a section of insulation layers 4 and 5 removed, or stripped, from core 2 and layer 3, in preparation for termination in accordance with the invention. *As will be apparent, the invention is also applicable to any type of cable having a central core and an outer layer or jacket portion concentric with and enclosing the central core.*

Figure 2:
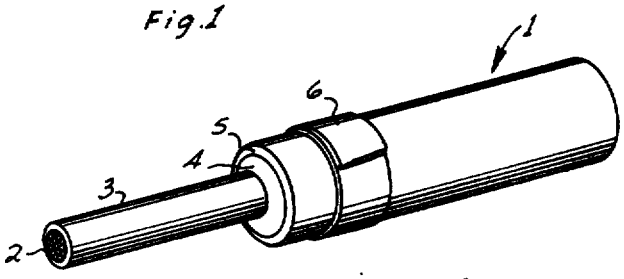
FIG. 2 is a perspective view of an ignition cable with an exposed central [resistive] conductor, having a wrap of metallic foil around the outer insulation, according to the invention.

FIG. 2 shows the ignition cable of FIG. 1, and having a strip of metallic foil according to the invention wrapped around the surface of outer insulation layer 5.

Figure 3:
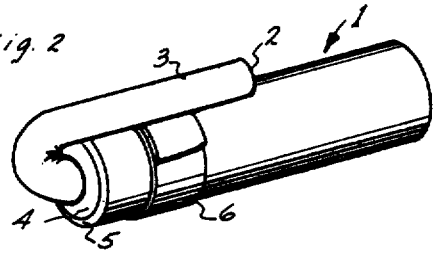
FIG. 3 is a perspective view of an ignition cable according to the invention, with a wrap of metallic foil, and with the central [resistive] conductor folded back over the foil and outer insulation prior to applying a terminal ferrule.

FIG. 3 shows the ignition cable of [FIGS.] *FIG.* 1, with central core 2 and layer 3 exposed and folded back over a sheet material shown as metallic foil wrapping 6 and the outer insulation layer 5. This sequence of operations, without the step of wrapping the cable with metallic foil, is known as a "strip-and-fold-back" termination method.

Figure 4:
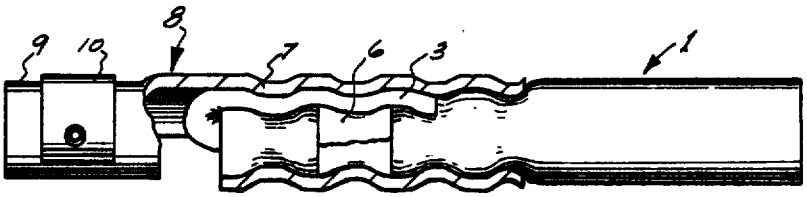
FIG. 4 is a side-elevational view, partially in section, showing a terminal ferrule clamped over the outer insulation, metallic foil, and central [resistive] conductor of FIG. 3.

FIG. 4 shows the ignition cable of FIG. 3 after an ignition terminal 8 has been clamped in place. Ignition terminal 8 includes terminal ferrule 7, adapted to be clamped to an ignition cable, and connector portion 9, adapted to connect to a conventional spark plug stud and including spring clip 10 adapted to retain connector portion 9 to a conventional spark plug stud. As shown in FIG. 4, clamping terminal ferrule 7 of ignition terminal 8 onto cable 1 causes elastic deformation of cable 1, including central core 2 and layer 3. *Of course, a solid wire core or stranded wire core would not be subject to the same elastic deformation.* In the absence of foil wrapping 6, when repetitively subjected to high temperatures, followed by cooling, this elastic deformation relaxes, and core 2 with layer 3 tends to embed itself into outer insulation layer 5, losing contact with terminal ferrule 7. Upon firing in this condition, a spark jumps between layer 3 and ferrule 7, which causes erosion of core 2 and layer 3, and eventual complete failure of the termination. In accordance with this embodiment of the invention, foil 6 deforms with wire 1, and maintains a conductive path between layer 3 and terminal ferrule 7 even if conductor 3 and terminal ferrule 7 are not in firm and direct contact, yielding a more reliable termination. *This advantage is also attained when the invention is applied to solid wire core or stranded wire core types of ignition cable. Of course, with these types of cable used, there is no conductive layer surrounding the conductive core.*

Figure 5:
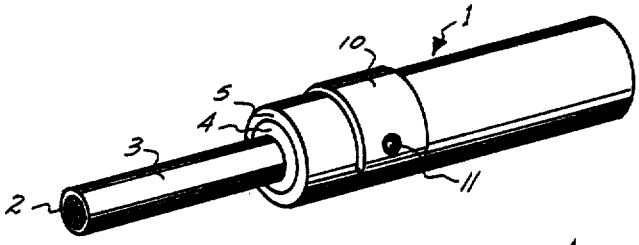
FIG. 5 is a perspective view of an ignition cable with exposed central [resistive] conductor, showing a preformed metallic sheet member placed on the outer insulation of the ignition cable, according to the second embodiment of the invention.

FIG. 5 illustrates a second embodiment of the invention. As shown in FIG. 5, a sheet material shown as a C-shaped conductive metallic strip 10 is placed over outer insulating layer 5, covering approximately 270° of the circumference of layer 5. This embodiment has been used to advantage with a C-shaped stainless steel strip 10, approximately 0.015 inches (0.038 cm) thick, having identations 11 adjacent either end, placed on cable 1 by pushing cable 1 through strip 10.

Figure 6:
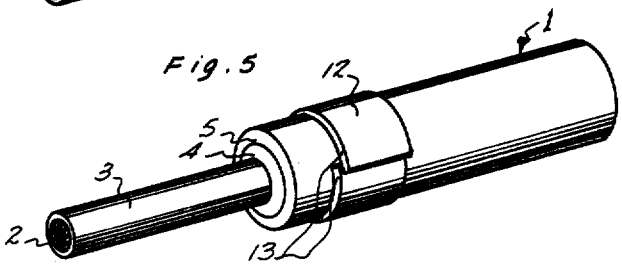
FIG. 6 is a perspective view showing an ignition cable having a metallic sheet member wrapped over the outer insulation, according to the preferred embodiment of the invention.
Figure 7:
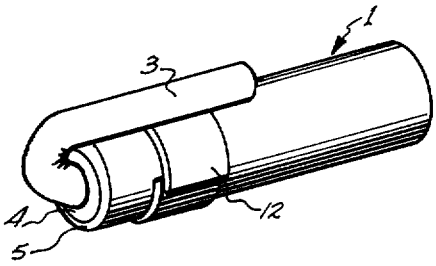
FIG. 7 is a perspective view, according to the third preferred embodiment of the invention, of the cable of FIG. 6 with the central [resistive] core folded back over the metallic sheet member and the outer insulation.

FIG. 6 illustrates a third and preferred embodiment of the invention. A piece of sheet material shown as strip 12 is a strip of stainless steel bent around cable 1, with overlapping ends 13. In a workable embodiment, strip 12 has been [found] *formed* from a strip of stainless steel, 0.156 inches (0.396 cm) wide, 0.012 inches (0.030 cm) thick, and approximatey 1 inch (2.54 cm) long, applied to cable 1 by automated equipment after the automated stripping operation, to form a band, with an overlapping section disposed so that layer 3 *or a solid wire core or a stranded wire core* will not be pinched by it when terminal ferrule 7 is applied, encircling cable 1.

Figure 8:
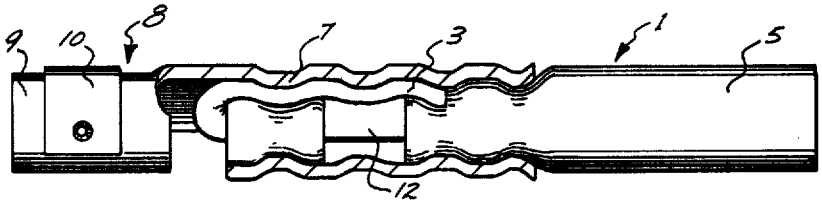
FIG. 8 is a side-elevational view, partially in section, showing a terminal ferrule applied over the ignition cable as shown in FIG. 7.

As shown in FIG. 8, a terminal 8 including ferrule portion 7, is crimped in place over outer layer 5, core 2 and layer 3, and strip 12, with ferrule portion 7 causing primarily elastic deformation of cable 1. Strip 12 is also deformed, but this deformation does not relax when the terminal is repeatedly subjected to high and low temperatures, serving to maintain conductive layer 3 in firm contact with terminal ferrule portion 7, and provide additional electrical contact area between the portion of conductive layer 3 adjacent outer insulation layer 5, and terminal ferrule 7, over a substantial portion of its circumference. Therefore, the addition of strip 12 (or strip 10) *to restive core ignition cable, solid wire core ignition cable or stranded wire core ignition cable* can be quickly and conveniently performed with automated equipment in a high-speed mass-production line, and results in a substantial increase in reliability of the ignition cable assembly at a minimal additional expenditure.

It should also be noted that a wrapping, or even a small pad, of nonconductive sheet material placed between insulation layer 5 and conductive layer 3 will also prolong the life of the cable termination by locally increasing the force pressing conductive layer 3 against ferrule 7, and preventing the folded-back core from becoming embedded in the outer insulation. Although functional, this is less desirable since it does not provide an alternate conductive path between conductive layer 3 and ferrule 7.

It is to be understood that one skilled in the art may be capable of [practising] *practicing* and carrying out the invention in various ways, and with various modifications of the disclosed embodiments, without departing from the spirit of the invention and scope of the appended claims.

I claim:

1. A method of attaching a terminal to an ignition cable for use with internal combustion engines, said cable having a central [resistive] conductive core, an inner insulation layer concentric with said core and an outermost insulating layer concentric with and surrounding said inner insulation layer, comprising the steps of;

removing a portion of said inner insulation layer and of said outermost insulating layer from said conductive core for a predetermined distance from an end of said cable to form an exposed core end portion;

placing a narrow strip of conductive sheet material in contact with at least a portion of the circumference of said outermost insulating layer adjacent said core end portion;

bending said core end portion back over said sheet material; and clamping a terminal ferrule over said core end portion, said sheet material and said outermost insulation layer to make direct electrical contact between said core end portion and said ferrule.

2. A method according to claim 1, wherein:

said step of placing said sheet material in contact with said outermost insulating layer includes the step of wrapping a strip of metal foil around said outermost layer of said cable.

3. A method according to the claim 1, wherein:

said step of placing said sheet material in contact with said outermost insulating layer includes the step of placing a C-shaped metal strip around said outermost layer of said cable.

4. A method according to claim 1, wherein:

said step of placing said sheet material in contact with said outermost insulating layer includes the step of bending a metal strip around the periphery of said outermost layer of said cable to form a band around said cable.

5. An ignition cable assembly having an outermost insulating layer, an inner insulating layer concentric with said outermost layer and a central [resistive] conductive core and a terminal ferrule fastened to said cable at an end thereof, characterized in that a predetermined length of said conductive [resistive] core is exposed at said end of said cable, a portion of said exposed core is bent back over said outermost insulating layer, a narrow strip of conductive sheet material is interposed between said bent back portion of said exposed core and said outermost insulating layer, said sheet material[,] and said bent back portion of said exposed core, to [form] *make* a permanent electrical connection between said core and said ferrule, said sheet material being adapted to prevent plastic deformation of said cable due to elevated ambient temperature from affecting said electrical connection.

6. An ignition cable according to claim 5, wherein said sheet material is a narrow strip of conductive metallic foil wrapped around said outermost insulating layer.

7. An ignition cable according to claim 5, wherein said sheet material is a narrow conductive metal strip substantially concentric with at least one half of the periphery of said outermost [conducting] *insulating* layer.

*8. A method of attaching a terminal to a cable, said cable having a central conductive core, and an outermost insulating layer concentric with and surrounding said central conductive core, comprising the steps of:*

*forming an exposed core end portion by removing said outermost layer from said central conductive core for a predetermined distance from an end of said cable; then*

*placing a narrow strip of conductive sheet material in a circumferential direction with respect to said cable and in contact with substantially more than half of the circumference of said outermost insulating layer adjacent said core end portion; then*

*bending said core end portion back over said sheet material; and then*

*clamping a terminal ferrule over said core end portion, said sheet material and said outermost insulation layer to make direct electrical contact between said core end portion and said ferrule.*

*9. A cable assembly having an outermost insulating layer and a central conductive core and a terminal ferrule fastened to said cable at an end thereof, characterized in that a predetermined length of said conductive core is exposed at said end of said cable, a portion of said exposed core is bent back over said outermost insulating layer, and a narrow strip of sheet material is disposed in a circumferential direction with respect to said cable and in contact with substantially more than half of the circumference of said outermost insulating layer and interposed between said bent back portion of said exposed core to form a permanent electrical connection between said core and said ferrule.*

* * * * *